Dec. 14, 1954 C. J. MILLER 2,697,137

HIGH-FREQUENCY AMPLIFIER

Filed Aug. 17, 1948 2 Sheets-Sheet 1

WITNESSES:

E. A. McClaskey.

Leon M. Garman

INVENTOR

Coleman J. Miller.

BY

F. E. Browder

ATTORNEY

Dec. 14, 1954 C. J. MILLER 2,697,137
HIGH-FREQUENCY AMPLIFIER
Filed Aug. 17, 1948 2 Sheets-Sheet 2

WITNESSES:
E. A. McCloskey
Leon M. Garman

INVENTOR
Coleman J. Miller
BY
F. E. Browder
ATTORNEY

United States Patent Office 2,697,137

Patented Dec. 14, 1954

2,697,137

HIGH-FREQUENCY AMPLIFIER

Coleman J. Miller, Catonsville, Md., assignor to Westinghouse Electric Corporation, East Pittsburgh, Pa., a corporation of Pennsylvania Application August 17, 1948, Serial No. 44,631

4 Claims. (Cl. 179—171)

This invention relates to high power, high frequency amplifiers for radio transmitter applications and the like, and has for its principal object the provision of an amplifier design which will enable the use of a plurality of vacuum tubes in a single circuit of high efficiency and great compactness.

In order to obtain high power outputs at the higher radio frequencies, for example in the range of from 50 to 1000 megacycles per second, it is generally desirable to provide an output amplifier using a number of tubes in the single output stage. Various methods have been employed for the interconnection of such tubes in order to provide a maximum efficiency without undue sacrifices of space, weight and convenience in operation. All of these prior art methods, however, have involved design compromises which have necessitated less than optimum output or other disadvantages. For example, a two tube amplifier of prior art construction has commonly been designed to operate the tubes in a push-pull circuit which requires shielded tuning elements, for instance in the form of a shielded open-wire line which is not conducive to mechanical simplicity or compactness. The attempt to extend this construction to amplifiers using a plurality of sets of push-pull tubes has involved considerable complication in the direction of shielding of the cathode, filament or heater connections, and the use of extensive bus systems for interconnecting in parallel the corresponding electrodes of the pairs of tubes. Particularly where such amplifiers have employed high power tubes requiring high voltages on certain of their electrodes, the lack of symmetry has involved serious insulation or space problems, and the extensive interconnecting circuits have required more space than is desirable, particularly where compactness is an important feature. At the same time, this lack of symmetry has made it difficult to balance the tubes of each pair with respect to one another, as well as raising the same difficulty with reference to the tubes of different pairs.

It is accordingly an object of the present invention to provide a high frequency, high power, multi-tube amplifier which will overcome the above and other disadvantages of prior constructions, and which will be particularly useful in applications requiring compact, relatively wide-band amplifiers, such as are used in frequency modulation or television transmitters, for example, and especially where such transmitters must be installed in proximity to other equipment, as in airborne installations.

A further object of the invention is to provide an amplifier of the above type in which all of the tubes are connected in parallel, thus achieving a symmetry which is impossible with a multiple array of push-pull amplifier tube sets. Still another object is to provide an amplifier of this kind in which each tube is surrounded by exactly the same mechanical and electrical configuration, and thus contributes an equal share of the output power, if the tubes themselves are balanced or electrically identical. This is of particular importance in a high power amplifier where the individual tubes are so large, and the voltages thereon are so large, that any lack of symmetry in the circuit would be reflected as a substantial lack of equality of applied voltage.

A further object of the invention is to provide an amplifier of the above type in which all of the tubes operate into a single large tank circuit, and in which the parallel connection of the tubes provides the lowest possible output impedance. The use of a single large tank circuit makes it possible to reduce substantially the losses incurred in the interconnection of separate tubes by separate resonant lines, and the effective "Q" of the amplifier tank is thereby increased.

Still an additional object is to provide a mechanical construction of the tank circuit which is very economical to manufacture, since all of the parts thereof are figures of revolution which are adapted to spinning or lathe operations with a minimum of cost as compared with intricate hand-made or hand-assembled configurations. The construction in accordance with the preferred form of my invention provides inherent mechanical support for the vacuum tubes, and renders them essentially unitary, in the finished amplifier, with the tank circuit.

An additional object of the invention is to provide an amplifier of the type described in which a minimum of separate internal connections is required, and in which the necessary by-pass capacitances are provided as incidents, in a sense, to the required conductive or mechanical parts of the assemblage. Such construction not only makes for greater electrical efficiency, but also reduces further the cost of manufacture, since the number of different assembly operations and parts required are reduced.

Another object of the invention is to provide such an amplifier in which the operations of tuning the grid and plate circuits are simplified by the use of inherently balanced and equalized, ganged controls, and in which provision is made for matching the output line to the parallel-connected plates of the vacuum tubes.

The above and other objects and advantages of my invention will best be understood by referring to the following detailed specification of a preferred embodiment thereof, taken in connection with the appended drawings, in which.

Figure 1:
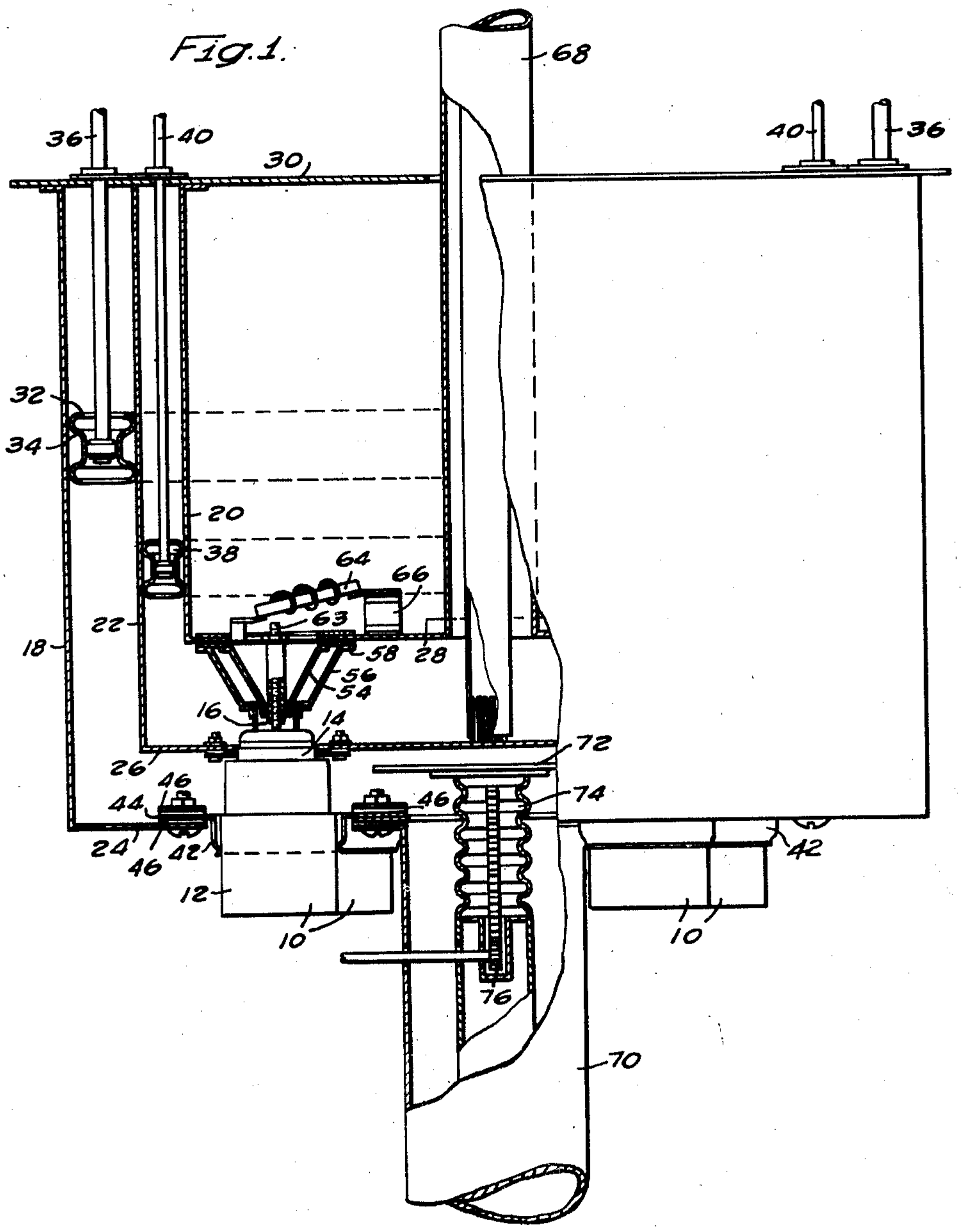
Figure 1 is a side elevation, with parts broken away and parts in section, of a preferred form of the invention.
Figure 2:
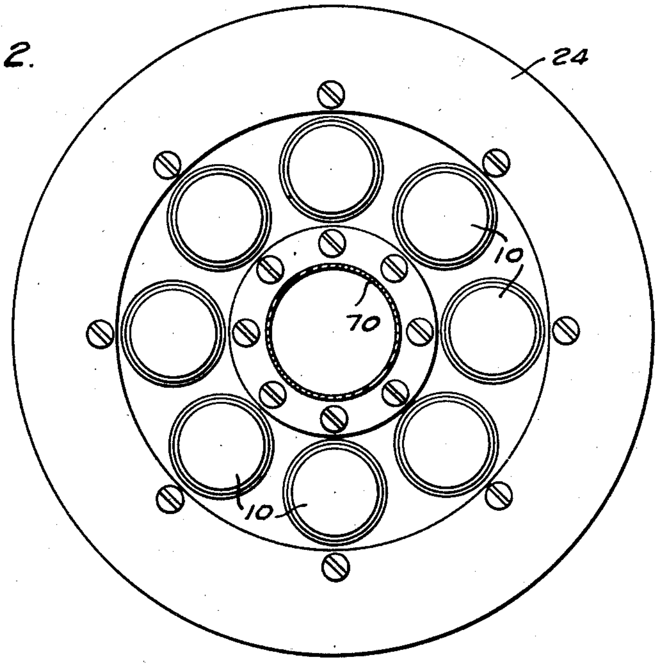
Fig. 2 is a plan view, looking at the bottom of the amplifier of Fig. 1.

Referring now to Figs. 1 and 2 of the drawings, I have illustrated a preferred form of the invention utilizing a plurality (here eight) of high power vacuum tubes arranged in a circular array about the physical axis of a tank circuit formed entirely of figures of revolution. Since all of the tubes are identical, they have been designated in the drawings by the single reference numeral 10, and each comprises a shell portion 12 constituting the plate connection, an inner shell portion 14 constituting the grid connection, and a terminal portion 16 which carries the filament connections. Since the construction of such tubes is in itself well known in the art, the internal details thereof are not illustrated. The tank circuit which is common to all of the tubes is formed in this embodiment by a series of concentric cavities defined by an outer cylindrical wall 18, an inner cylindrical wall 20, and an intermediate cylindrical wall 22 which forms, between the inner and outer walls, the resonant grid and plate tuning cavities.

The cylindrical walls 18 to 22 described above are suitably closed as by annular or disc-like end plates 24, 26 and 28 at their lower ends, and by a common annular plate 30 at their upper ends, the latter being apertured for the passage of a concentric line type of grid input circuit to be described below. Each of the annular plate and grid cavities is individually tuned by means of a concentric tuning bar, annular in shape, which is arranged to slide within the respective cavities, the plate tuning bar herein being designated by numeral 32 and being provided with spring contact fingers 34 adapted to maintain electrical contact with both the walls of this cavity as the bar is moved upwardly or downwardly by the application of tractive effort to a series of spaced actuating rods 36 passing through the end wall 30. A similar annular tuning bar 38 is provided for the grid cavity, and may be adjusted by movement of rods 40 connected thereto. It will be observed that all of the cylindrical walls 18, 20 and 22, and the end walls or plates 24, 26 and 28 are at the same direct current potential, which may conveniently be chosen to be at zero or ground direct current potential, since this enables the required by-pass capacitances to be provided by simple mechanical means now to be described.

Figure 3:
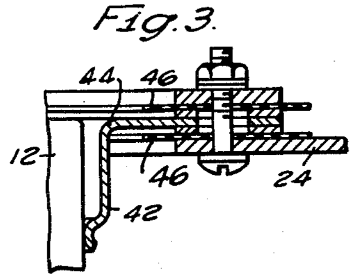
Fig. 3 is an enlarged, fragmentary sectional detail illustrating the manner of by-passing the plate terminals of the vacuum tubes to the appropriate wall of the tank circuit.
Figure 4:
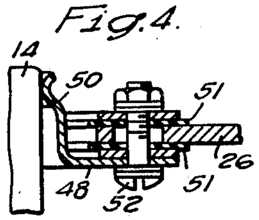
Fig. 4 is a view similar to Fig. 3 of the grid by-pass connection to the tank assembly.

Surrounding a portion of the outer or plate-connection shell 12 of each tube 10, as detailed in Fig. 3, is a ring 42 provided with spring fingers to ensure good contact with the shell, which ring has a flange portion 44 which may overlie a portion of end wall or plate 24 surrounding the circular aperture therein which accommodates the tube, and this flange is bolted or otherwise secured to said plate 24, being separated therefrom by a layer of a suitable dielectric material 46 which therefore forms a capacitor between the plate connection shell 12 of each tube, to ground potential represented by the plate 24. Similarly, as shown in Fig. 4, the grid connection of each tube is by-passed to ground by a capacitance provided between the flange 48 of a spring contact ring 50 in contact with the grid shell 14 and the plate 26, a suitable dielectric being indicated at 51. In both of these capacitances, a suitable value may be chosen by proper selection of the thickness of the dielectric, or the use of a parallel combination of capacitances formed by the use of additional layers of dielectric and auxiliary plates, connected electrically in parallel through the common conductor formed by the mounting screws 52.

Figure 5:
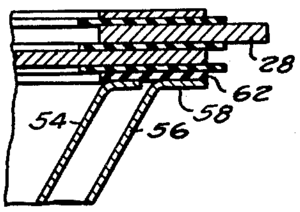
Fig. 5 is a view similar to Fig. 3 but pertaining to the filament connection.

Fig. 5 illustrates a possible arrangement for the by-passing of both of the filament leads to the end plate 28, these leads being shown as conductor 56 having a flanged end 58 insulated from the end plate 28 by suitable dielectric material 62, as above described in connection with the plate and grid by-passing. The element 54 provides an air duct between itself and 56 for providing adequate cooling of the filament seal. Electrical conduction to the filament or cathode leads 16′ may be provided in any desired manner as by means of post 63 or the like passing through these multi-layer structures but insulated therefrom.

The required connections to the filaments of the tubes, and to their plate shells 12 are readily made without passing into either of the tuning cavities, but the conductive connection to the grid connection or shell 14 must pass through the grid tuning cavity defined by walls 20 and 22 and by end plates 26 and 28. This connection, which is not shown in the drawings, will therefore have high frequency voltage induced therein. The current flow at radio frequencies due to this induced voltage is therefore suitably inhibited by the use of an R. F. choke element 64 connected in series with each of the grid leads, and one end of each such choke element is suitably by-passed to the innermost end plate 28 by a by-pass capacitor 66.

An important feature of the above arrangement is the manner in which it enables the input and output lines to be arranged without disturbing the symmetry of the entire amplifier. As best shown in Fig. 1, the input to the grid cavity comprises a quarter-wave length of concentric line 68 which matches the low impedance of the amplifier grid circuit to a 50 ohm concentric line from the driver stage. For frequency modulated applications, this line is made a quarter-wave long at the frequency corresponding to the center of the FM band, and its impedance remains sufficiently constant over the whole FM band so that no adjustment is necessary.

The high frequency power output from the plate cavity is transmitted by a concentric output line designated by numeral 70. Since the impedance looking into this line is considerably lower than the proper load impedance for the tubes, and since it is subject to variation, a variable capacitor plate 72 is provided which, in conjunction with the tuning adjustment provided by the plate cavity tuning bar 32, enables the impedance of the output line to be properly matched to the parallel connected outputs of the tubes. This capacitor plate 72 is connected to the center conductor of the concentric line 70 by an extensible metal bellows 74, and is adjusted by a rack and pinion arrangement 76 inside the inner conductor. The pinion shaft may conveniently be made adjustable from the exterior by forming it of low loss insulating material so that it may be passed through apertures in the inner and outer conductor without affecting the transmission of high frequency energy over the line.

Figure 6:
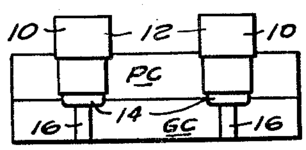
Figs. 6, 7 and 8 are schematic views of other possible configurations which may be assumed by the resonant cavity tank circuit in accordance with the invention.
Figure 7:
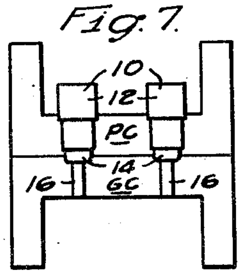
Figure 8:
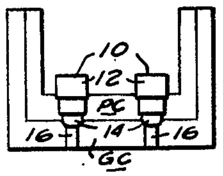

The particular configuration of the plate and grid tuning cavities shown above is, of course, merely exemplary of the possible arrangement. Figs. 6, 7 and 8 illustrate schematically three other possible arrangements thereof, the plate, grid and cathode of the tubes therein being denoted by the numerals 12, 14 and 16, respectively. The plate and grid tuning cavities in these figures are denoted by the symbols PC and GC, respectively, and it will be observed that all of the illustrated arrangements preserve the symmetry of arrangement which is responsible for the efficient and economical amplifier described in detail in connection with the previous embodiment.

Various modifications in the manner of connecting to the tube elements, in the tuning of the cavities and in the couplings to the input and output lines, as well as in other details of construction, can be effected without departing from the spirit of my invention as defined in the appended claims.

I claim as my invention:

1. A radio-frequency generator comprising a plurality of electron tube units disposed in a circle about an axis and each having electrodes, a resonator comprising an annular cavity, the axis of the annulus defined by said cavity being coincident with said first named axis, said cavity having a conductor electrically connected to an electrode of each of said tube units, a hollow transmission line extending axially of said circle, and energy coupling means comprising a circular slot communicating between said line and resonator.

2. A radio-frequency generator comprising a plurality of electron tube units disposed in a circle about an axis and each having electrodes including an anode and cathode, an output resonator comprising an annular cavity, the axis of the annulus defined by said cavity being coincident with said first named axis, said cavity having a conductor electrically connected to the anode of each of said tube units, an input resonator comprising an annular cavity, the axis of the annulus defined by said cavity being coincident with said first named axis, said cavity having a conductor electrically connected to the cathode of each of said tube units, a hollow input transmission line extending axially of said circle, energy coupling means comprising a circular slot communicating between said input line and input resonator, a hollow output transmission line extending axially of said circle, and energy coupling means comprising a circular slot communicating between said output line and output resonator.

3. A radio-frequency generator comprising a plurality of electron tube units disposed in a circle about an axis and each having electrodes including an anode and cathode and grid, an output resonator comprising an annular cavity, the axis of the annulus defined by said cavity being coincident with said first named axis, said cavity having a cylindrical conductor electrically connected to the anode of each of said tube units, an input resonator comprising an annular cavity, the axis of the annulus defined by said cavity being coincident with said first named axis, said cavity having a cylindrical conductor electrically connected to the cathode of each of said tube units, a conductor common to said resonators comprising a member extending transversely of said axis and electrically connected to the grid of each of said tube units, a hollow transmission line extending axially of said circle, and energy coupling means comprising a circular slot adjacent said transverse member and communicating between said line and one of the resonators.

4. A radio-frequency generator comprising a plurality of electron tube units disposed in a circle about an axis and each having electrodes including an anode and cathode and grid, an output resonator comprising an annular cavity, the axis of the annulus defined by said cavity being coincident with said first named axis, said cavity having a cylindrical conductor electrically connected to the anode of each of said tube units, an input resonator comprising an annular cavity, the axis of the annulus defined by said cavity being coincident with said first named axis, said cavity having a cylindrical conductor electrically connected to the cathode of each of said tube units, a conductor common to said resonators comprising a member extending transversely of said axis and electrically connected to the grid of each of said tube units, a hollow input transmission line extending axially of said circle, energy coupling means comprising a circular slot adjacent said transverse member and communicating between said input line and input resonator, a hollow output transmission line extending axially of said circle, and energy coupling means comprising a circular slot adjacent said transverse member and communicating between said output line and output resonator.

References Cited in the file of this patent

UNITED STATES PATENTS

| Number | Name | Date |
|---|---|---|
| 2,235,414 | White | Mar. 18, 1941 |
| 2,262,020 | Llewellyn | Nov. 11, 1941 |
| 2,284,405 | McArthur | May 26, 1942 |
| 2,401,489 | Lindenblad | June 4, 1946 |
| 2,408,355 | Turner | Sept. 24, 1946 |
| 2,415,485 | Haller | Feb. 11, 1947 |
| 2,421,635 | McArthur | June 3, 1947 |
| 2,424,089 | Gethmann | July 15, 1947 |
| 2,432,193 | Gubin | Dec. 9, 1947 |
| 2,434,116 | McArthur | Jan. 6, 1948 |
| 2,485,400 | McArthur | Oct. 18, 1949 |